United States Patent [19]

Eddy

[11] Patent Number: 5,135,325

[45] Date of Patent: Aug. 4, 1992

[54] EMERGENCY BOOM FOR USE ON A TANKER

[76] Inventor: David L. Eddy, 275 Pomeroy La., Amherst, Mass. 01002

[21] Appl. No.: 736,788

[22] Filed: Jul. 29, 1991

[51] Int. Cl.$^5$ .......................................... E02B 15/06
[52] U.S. Cl. ...................................... 405/66; 405/63; 114/68; 114/229
[58] Field of Search ...................... 405/63, 66, 67, 68, 405/69, 70, 71, 72; 210/923; 114/68, 69, 227, 229

[56] References Cited

U.S. PATENT DOCUMENTS

| | | | |
|---|---|---|---|
| 496,598 | 5/1893 | Cinamon | 114/229 X |
| 1,307,040 | 6/1919 | Christensen | 114/229 |
| 3,118,412 | 1/1964 | Smith | 114/68 |
| 3,118,413 | 1/1964 | Smith | 114/68 |
| 3,118,414 | 1/1964 | Smith | 114/68 |
| 3,599,434 | 8/1971 | Missud | 405/66 |
| 3,665,713 | 5/1972 | Rath | 405/66 |
| 3,952,350 | 4/1976 | Moucka | 114/68 X |
| 4,049,170 | 9/1977 | Kawakami et al. | 226/74 |
| 4,076,624 | 2/1978 | Tolan | 210/96 R |
| 4,249,834 | 2/1981 | Bouvier | 405/70 |
| 4,627,766 | 12/1986 | Marquet | 405/195 |
| 4,960,347 | 10/1990 | Strange | 405/63 |
| 4,998,845 | 3/1991 | Smith | 405/71 X |
| 5,051,029 | 9/1991 | Ecker | 405/66 X |
| 5,056,957 | 10/1991 | Wood | 405/63 X |
| 5,066,164 | 11/1991 | Tomosy | 405/63 X |

FOREIGN PATENT DOCUMENTS

80/01580  8/1980  PCT Int'l Appl. .................. 405/66

Primary Examiner—Randolph A. Reese
Assistant Examiner—Arlen L. Olsen
Attorney, Agent, or Firm—Burns, Doane, Swecker & Mathis

[57] ABSTRACT

A water pollution containment device comprises a number of uniform assemblies joined to adjacent uniform assemblies around the periphery of a liquid cargo carrying vessel such as an oil tanker. The uniform assemblies each include a skirt which is joined to the skirts of the adjacent uniform assemblies, a skirt launching device, a skirt retrieving device and a housing structure for the foregoing. The uniform assemblies may be operated to contain spills around a leaking vessel, to contain spills around a sunken vessel and may be quickly and easily inspected and maintained.

14 Claims, 5 Drawing Sheets

EMERGENCY BOOM FOR USE ON A TANKER

BACKGROUND OF THE INVENTION

1. Field of the Invention

The present invention relates to an emergency boom for use on a tanker for retaining material that leaks from the tanker.

2. Related Art

Recent tragedies involving oil spills suggest that existing techniques of avoiding or abating such disasters are insufficient. Even requiring that tankers be constructed or retrofitted with double hulls cannot be certain to avoid many disasters. Indeed, because a double hull decreases available cargo capacity by a substantial amount, it would seem likely that tankers with double hulls will have to become much bigger in order to compete with single hulled vessels. Consequently, disasters involving the double-hulled vessels can often be expected to be as bad as those involving single hulled vessels.

A number of prior art devices and methods have attempted to address the problem of how to respond once a leak in a tanker or a spill at an offshore oil rig has occurred. Most methods of response occur significantly after the fact of the spill, primarily because cleanup response devices and techniques cannot be transported to the source of the spill quickly enough. The desirability of an effective way to confine such spills at or near their source until response by distant parties can be effected has become clear to many.

A few examples of spill confinement techniques and devices already exist. U.S. Pat. No. 3,599,434 to Missud teaches the use of a floatable tube and skirt assembly to encircle an offshore oil drilling rig. The floatable tube and skirt assembly includes means for raising and lowering the skirt and retracting or extending the tube and skirt assembly. and retracting or extending the tube and skirt assembly. However, because the assembly can be left in the water on a drilling rig, obviously not a possibility on a vessel intended for transportation, there is not disclosed an acceptable means of withdrawing the assembly from the water for repackaging after use. The withdrawal means suggested in the reference would be too bulky for practical use on board a vessel.

U.S. Pat. No. 4,249,834 to Bouvier teaches the use of a flotation collar structure surrounding the periphery of a vessel in order to contain oil spills. One embodiment of the disclosure contemplates a deployable containment device surrounding the periphery of the vessel. However, while providing that such a device is capable of being stored, Bouvier proposes no technique by which a deployed device can be put back into storage.

U.S. Pat. No. 4,960,347 to Strange also contemplates the use of a barrier curtain deployed to contain a spill. In this disclosure the curtain may consist of several segments which are unfurled immediately around the leak or which may completely surround the vessel. A life boat davit may be modified to suspend the curtain over the vessel's edge and to permit furling and unfurling. This apparatus, however, is unwieldy and the document does not indicate that it might be possible to shield the apparatus from the elements while still being able to effectively deploy the curtain in emergencies.

Prior to the present invention, there was a need for a quickly deployable, effective and easily repackaged containment device aboard a tanker. In addition to the foregoing, there was a need for such a device that included means to permit periodic inspections of and repairs to the components of the device without engaging in a massive undertaking.

SUMMARY OF THE INVENTION

The present invention contemplates a water pollution containment device capable not only of containing water pollution spilling from a vessel such as an oil tanker or an oil rig, but which is also designed to be easily deployed and retrieved in emergency conditions, as well as being easily installed and maintained under normal conditions.

The present invention includes a plurality of uniform housing structures disposed around the outer periphery of a vessel, or a portion thereof, each housing structure containing an automatically deployable and retrievable flotation collar pollution containment device capable of extending to a depth well below the vessel's depth.

The present invention further includes a pollution containment device capable of being periodically and easily inspected to ensure capacity for emergency deployment.

The present invention further includes a pollution containment device that is quickly and automatically severable from a vessel that is in danger of sinking.

BRIEF DESCRIPTION OF THE DRAWINGS

These and other benefits of this invention will be better appreciated by reference to the detailed description and the drawings, wherein.

DETAILED DESCRIPTION OF THE PREFERRED EMBODIMENTS

A preferred embodiment of the water pollution containment device of the present invention is illustrated in FIGS. I to 9. The water pollution containment device 1 comprises primarily a skirt assembly 2 that can be deployed about the outer periphery of a tanker in the event of leakage of a pollutant such as oil from the tanker, and means for launching and retrieving the skirt assembly 2. The tanker is depicted in FIG. 1 with the skirt 2 fully deployed around the tanker.

In order to contain any pollutants that may escape from the tanker, the skirt 2 is preferably designed to extend to a depth well below the hull of the tanker.

Figure 1:
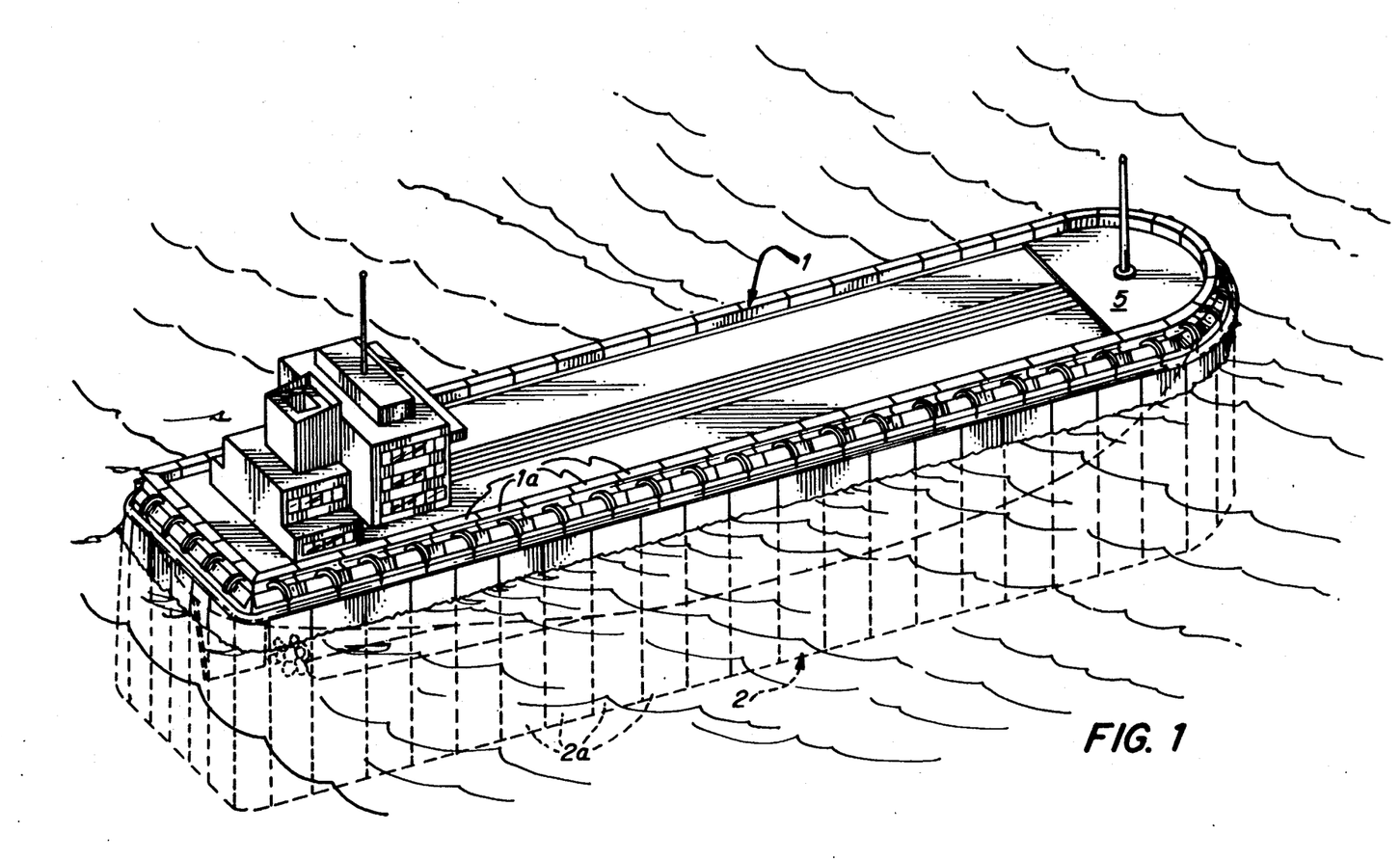
FIG. 1 is a perspective view of a tanker ship on which the units about the water pollution containment device of the present invention is deployed.

The water pollution containment device 1 includes a plurality of substantially identical housing units 1a, each of FIG. 1, each housing unit 1a and each skirt segment 2a is joined to a substantially identical housing unit 1a and corresponding skirt segment 2a at left and right edges to form a complete curtain around the vessel. Pollutants leaking from the vessel are trapped in the immediate vicinity of the vessel within the skirt 2.

Alternatively, it is not necessary that the water pollution containment device completely encircle the vessel. Alternative arrangements may include having the skirt cover only portions of the vessel most susceptible to rupture.

Figure 2:
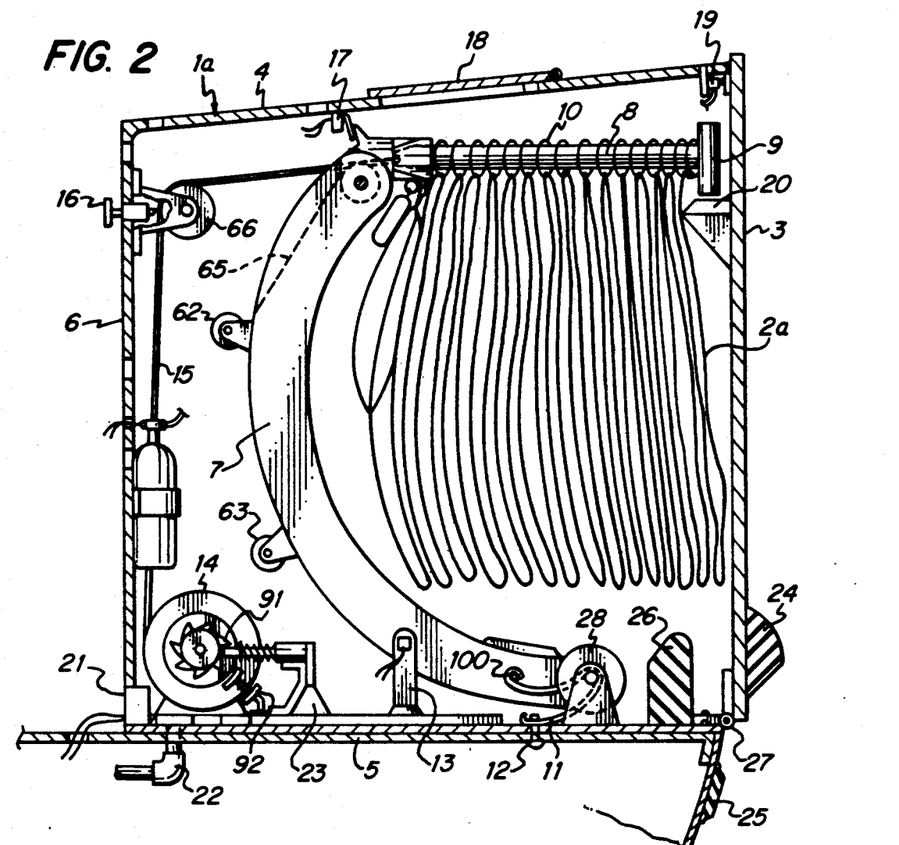
FIG. 2 is a cross-section of a representative housing unit showing an undeployed water pollution containment device of the present invention.

FIG. 2 depicts a cross-sectional view of a typical housing unit 1a with the water pollution containment device 1 in a stored condition. Each housing unit 1a has a roof 4, a rear wall 6, a deck floor 5, and a door 3. The door 3 is illustrated attached to the floor 5 by means of a hinge 27 at the bottom of the door, the hinge being so affixed to the door 3 and the floor 5 as to permit the door 3 to open outwardly from the housing unit 1a. The door 3 is illustrated attached to the roof 4 by one or more door latches 19. The edges (not shown) of such a typical housing unit 1a are designed so as to mate with another substantially identical housing unit 1a to facilitate the interconnection of such substantially identical housing members around the periphery of a vessel. The door 3 includes rubber stops 24, 25 to protect the door 3 upon opening.

While, generally, for a given size of vessel, each housing unit 1a is substantially identical to every other housing unit 1a, largely to facilitate mass production and to minimize potential assembly confusion, it is further understood that special adaptations may be made necessary by various vessel angles such as those at the bow and at the turn of the stern, or because of other unique vessel features.

Within each housing unit 1a is a skirt segment 2a. Each skirt segment 2a is, like the edges of the housing unit 1a, joined at its edges to adjacent, substantially identical skirt segments 2a such that the skirt assembly surrounds the vessel. The skirt segments 2a may be connected edge to edge by any one of a variety of known means, such as by sewing or by cementing.

Each skirt is preferably constructed of a waterproof, oil resistant material. A vinyl-reinforced canvas is a preferred material because of its oil resistance, its minimal stretching, its uniform qualities, and its workability.

The skirt 2 is preferably designed so that when launched from the vessel to contain pollutants leaking from the vessel, the skirt 2 extends to a depth below that of the vessel's hull, preferably to a depth of at least one and one half times the depth of the vessel's hull.

The skirt segments 2a are suspended from davits 7 by top wires 50 that are sewn into the fabric along the upper edge of the skirt segments 2a. An identical bottom wire 51 is sewn into the bottom of each skirt segment 2a. The bottom wires 51 assist the skirt segments 2a in sinking quickly. Additionally, because the skirt segments 2a are joined to adjacent skirt segments 2a by means such as sewing or cementing, by extending the ends of the top and bottom wires beyond the edges of the skirt segments it is possible to shackle together the wire ends and thereby help to prevent shearing of the seams between adjacent skirt segments. The top and bottom wires are preferably ⅜ ″ in diameter.

It is also possible to construct each skirt segment 2a in the shape of a trapezoid having sides of equal length and having a wider bottom than top. A preferred shape for each skirt segment 2a includes top corner angles of 91 and bottom corner angles of 89°. When skirt segments 2a of such a trapezoidal shape are joined together as described above, the resulting skirt 2 has a larger circumference at its bottom than at its top and balloons when extended around a vessel. This ballooning permits a greater volume of pollution water to be contained within the skirt 2.

A plurality of rings 10 are attached to each skirt segment 2a at evenly spaced intervals over the length of the skirt segment 2a, approximately at its centerline. These rings 10 may be attached to the skirt by any one of a variety of known means, but a preferred method comprises the use of a ring with a metal base, passing the metal base through a hole in the skirt material, and reinforcing the connection with additional skirt material.

Figure 9:
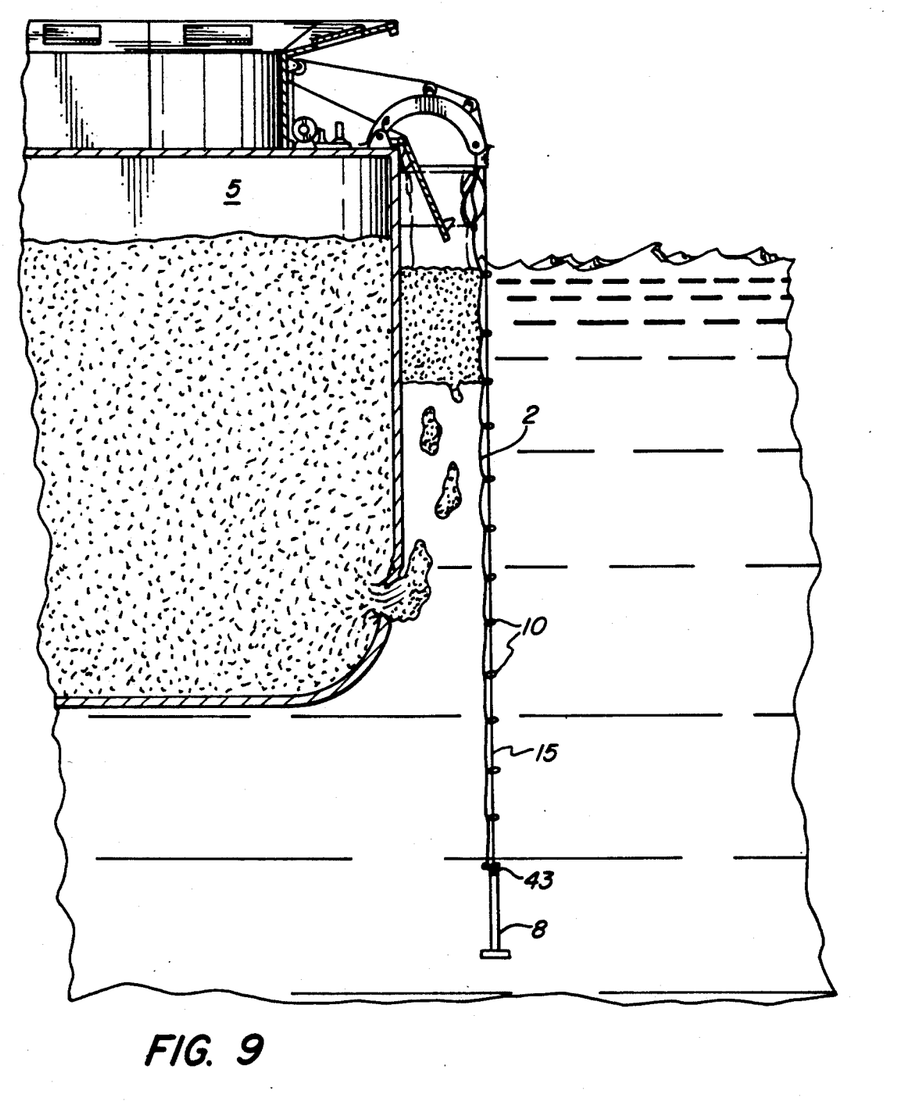
FIG. 9 shows a cross-sectional view of a ruptured oil tanker with a fully deployed water pollution containment device of the present invention.

As seen in FIG. 2, a rod 8 is used to store the water pollution containment device 1 in the housing by suspending the skirt segment 2a from the rod 8. The rod 8 passes through the rings 10, allowing the skirt segment 2a to hang folded in an accordion-type fold. When the skirt 2 is deployed around the vessel, the rod 8 is ejected from the housing unit 1a by the davit 7 and drags a wire guide 15 behind it. The skirt 2, which is ejected from the housing along with the rod 8, settles to its extended length, as shown in FIG. 9, with the rings 10 aligning along the wire guide 15. A weight 9 is attached to the rod 9, enabling the rod 8 to remain suspended underwater in a relatively motionless fashion, relatively unaffected by above-water weather conditions. The weight 9 may also be connected or fastened to the bottom wire 51. Thus, the skirt 2, when extended to its full length along the wire guides 15, also remains in a substantially vertical condition. The wire guides are preferably ¼″ 6×12 PhB/FC wire, or some nonferrous equivalent.

Figure 3:
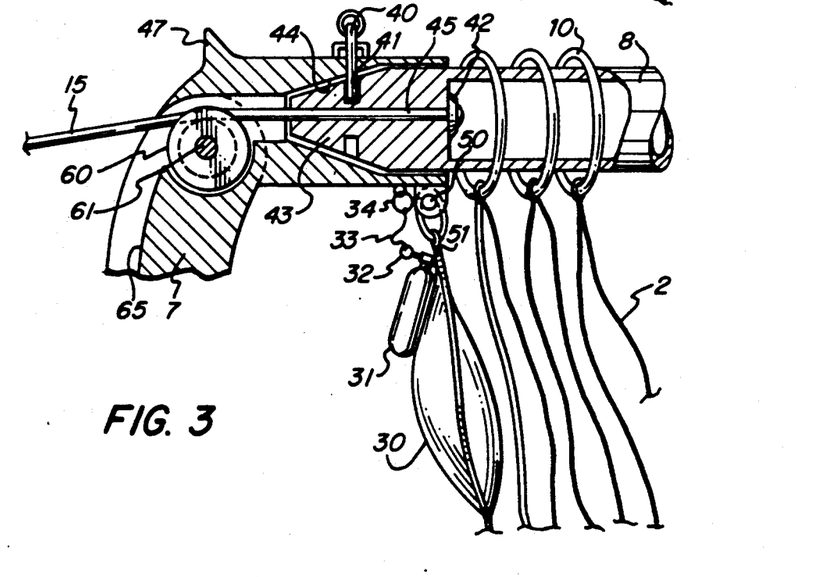
FIG. 3 is cross-sectional view of a portion of a device for deploying the water pollution containment device of the present invention.

With reference to FIGS. 2 and 3, each wire guide 15 is fastened to the end of a rod 8 that is opposite the weight 9. The wire guide is then passed through a davit pulley 60 located near the end of davit 7 and a rear wall pulley 66 fastened to the housing rear wall 6. The wire guide 15 is then secured to a winch 14 that is driven by an air motor and controlled by a winch release 23. The wire guides are used for lowering and raising the curtain into and out of the water.

The davits 7 are each secured to the housing floor 5 by a hinge 28. A spring 11 is fastened to each housing floor 5 by a bolt 12, and to the davit 7 by a pin 100. The spring 11 exerts a force on the davit in the clockwise direction, as seen in FIG. 2. A stop 26 is mounted adjacent the davit hinge 28 and limits the pivoting movement of the davit. A davit release 13 secures the davit 7 in the position shown in FIG. 2 and prevents unintentional launching of the davit 7.

To launch the skirt 2 around the vessel, an operator sends a remote signal to release the winch release 23, the davit release 13 and the door latches 19. The spring 11 rotates the davit 7, which pushes open the door 3 and pulls the wire guide 15 from its wound condition on the winch 14. The davit 7 is then stopped by the davit stop 26. The weight 9 and the rod 8 continue to descend over the edge of the vessel, further unwinding the wire guide 15 from the winch 14.

Figure 8:
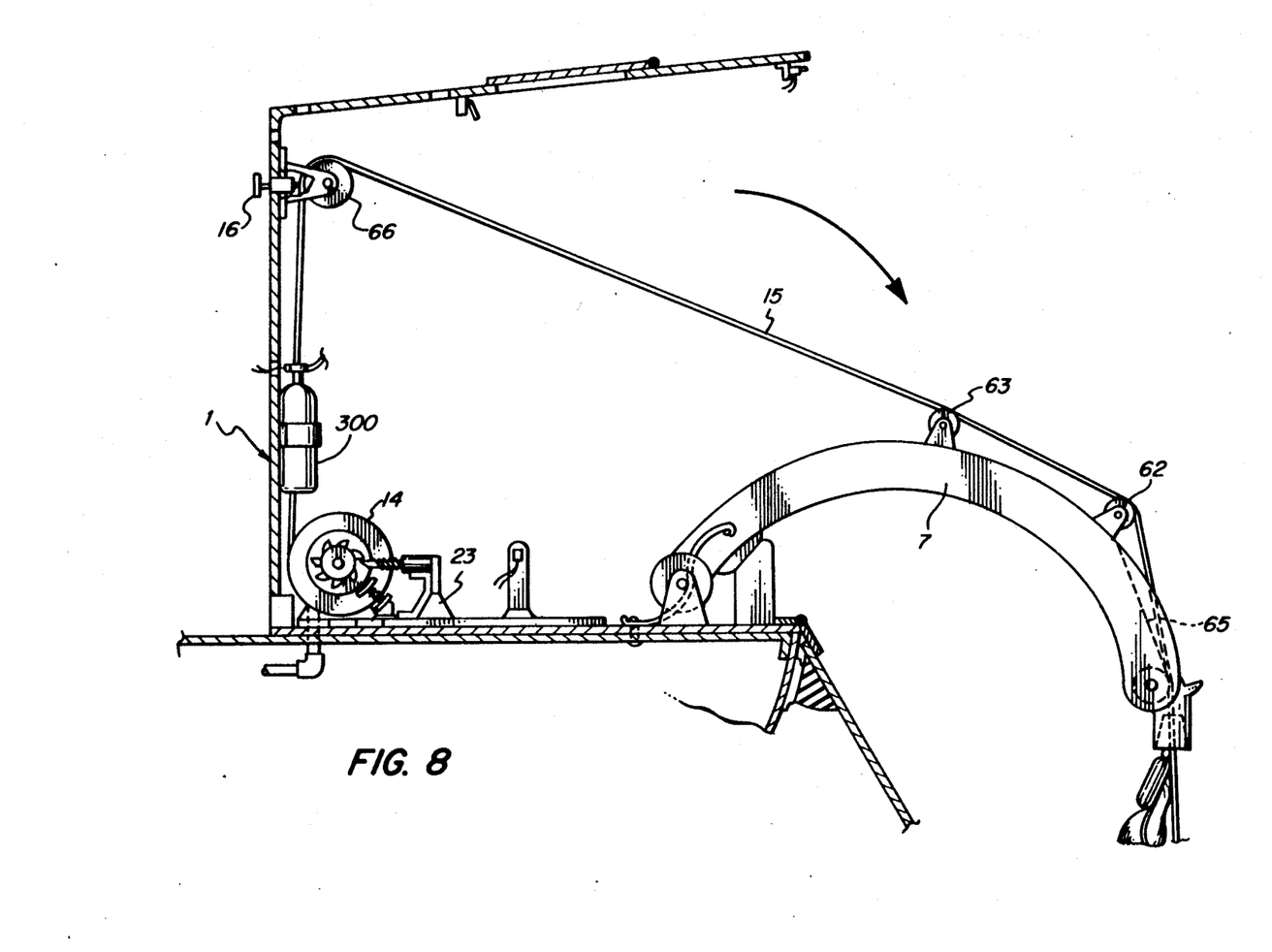
FIG. 8 shows a cross-sectional view of a housing unit after the water pollution containment device is fully deployed.

When the davit 7 is in its launched condition, as shown in FIG. 8, the wire guide 15 passes over first and second mounted pulleys 63 and 62, both of which may be mounted on a convex side of the davit 7, and further passes over the pulley 60 mounted on an axle 61 in the davit 7. The davit 7 preferably includes a slot 65 such that the wire guide 15 is able to extend from the second mounted pulley 62 to the pulley 60 without being in abrasive contact with the davit 7. The wire guide 15 also passes through the pulley 66 mounted on the rear wall 6.

Following the actuation of the winch release 23, the rod 8 and the attached weight 9 fall outboard of the vessel and pull the wire guide 15 along, unwinding the wire guide 15 from the now-released winch 14.

The skirt 2 unfolds down the now-extended wire guide 15, with the wire guide 15 passing through the rings 10 on the skirt. The bottom wire 51 assists the skirt in sinking down to its intended depth by acting as a weight. A cross-sectional view of a fully launched skirt and vessel is shown in FIG. 9.

To retrieve the skirt 2 for storage, the winch 14 winds up the wire guide 15, pulling the rod 8 and the weight 9 upward. The weight 9 is too large to pass through the rings 10. As a result, as the wire guide 15 is pulled upward, the rings 10 on the skirt segments 2a are collected on the rod 8, creating an accordion-type fold in the skirt 2.

As noted, when the wire guide 15 is wound up on the winch 14, it pulls the rod 8 and the weight 9 along with it, causing the rings 10 on the skirt segment 2a to be collected on the rod 8, further causing the skirt 2 to fold into an accordion-type fold. The winch 14 may be driven by an air motor (not shown). When the rod 8 is retrieved to the point that a tapered end 43 of the rod 8 is pulled into a female portion 44 of the davit 7, the winch 14 continues to take up the wire guide 15. As a consequence, the wire guide 15 rotates the davit 7 from the launched position, as depicted in FIGS. 8 and 9, back to the stored position inside the housing unit 1a, as shown in FIG. 2. When the davit 7 is pulled sufficiently far back into the housing unit 1a, a protruding point 47 on the davit 7 contacts a limit switch 17 that stops the motor driving the winch 14. At the same time the winch release 23 and the davit release latch 13 may be arranged to lock the winch 14 to prevent inadvertent unwinding, and to lock the davit 7 to prevent unintended launching.

Pulling the davit 7 back into the housing unit 1a also cocks the spring 11 for a subsequent launching. When the water pollution containment device 1 is in a stored condition, as shown in FIG. 2, the spring 11 possesses a certain amount of stored energy. The spring 11 releases this stored energy during the launching of the skirt 2 by pushing against a surface 100 on the davit 7, thereby rotating the davit 7 around its hinge 28, and thereby launching the skirt 2 around the vessel.

At the top of each skirt segment 2a is a flotation element 30. The flotation element 30 comprises an airtight section formed with or attached to each skirt segment 2a by any desired means. A preferred structure comprises simply forming a double roll of skirt material at the top of the skirt segment 2a and sealing the edges of the roll. Alternatively, however, each flotation element 30 of each skirt segment 2a may be joined end to end with adjacent flotation elements 30 of adjacent skirt segments 2a, creating a single, continuous flotation element 30a (not shown) around the periphery of the vessel. Within this continuous flotation element 30a, bulkheads 30b (not shown) may be installed, the bulkheads serving the purpose of preventing leaks in one discrete area of the continuous flotation element 30a from causing deflation of the entire continuous flotation element 30a. By including an individual flotation element 30 with each skirt segment 2a, however, the necessity for bulkheads is abrogated, as a leak in the flotation element 30 of one skirt segment 2a will not impact any other flotation elements 30 in any other skirt segments 2a.

When the skirt 2 is launched around a vessel, normally, as shown in FIG. 9, the flotation element 30 of each skirt segment 2a is in a deflated condition and is suspended from the davit 7 along with the rest of the skirt segment 2a. However, it may be desired to disconnect the skirt 2 from the vessel under certain circumstances, such as the sinking of the vessel, so that the skirt may continue to contain pollution, even though the vessel is no longer afloat or is otherwise incapable of suspending the skirt 2 around it. For such circumstances, each housing unit 1a is equipped with a guillotining means 16 which severs the wire guide 15 upon the receipt of a remote command or upon manual actuation. When the wire guides 15 are severed, the skirt segments 2a thus fall away from the davits 7 that had been suspending them and, in falling, a pin 32 on an air cylinder 31 included with each flotation element 30 is pulled, causing compressed air in the air cylinder 31 to inflate the air-tight flotation element 30. The flotation elements 30 are sized so as to be sufficiently buoyant when filled with air so as to be able to extend partially above water while supporting the weight of the entire skirt segment suspended below them. When the skirt 2 is severed from a vessel, it retains the entrapped pollution in much the same fashion as common oil booms.

Additionally, because the skirt balloons, the skirt 2 has a greater opportunity to trap pollutants continuing to leak from a sunken vessel beneath the skirt 2 than skirts that simply hang straight down. This only applies to pollutants such as oil that float in water. Likewise, by sizing skirts to be at least one and one half times the length of the depth of the hull of the vessel to which they are attached, the skirt is closer to a leaking source of pollution that has sunk and will be more likely to trap pollutants that continue to leak from it than would be a shorter boom.

Figure 5:
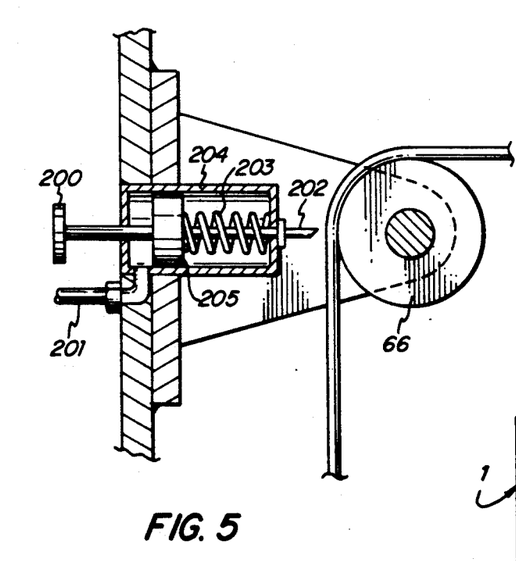
FIG. 5 is a view of an automatically or manually activated guillotine that permits the water pollution containment device of the present invention to be fully severed from the vessel that it enshrouds.

The wire guide severing guillotine 16, shown in FIGS. 1 and 5, cuts through the wire guide 15 when a remote signal is given. At such a signal, pressurized air passes through an airline 201 against a guillotine piston 205 to compress a spring 203, thereby driving a blade 202, attached to the piston 205, through the wire guide 15. Alternatively, the guillotine may be manually operated to sever the wire guide by striking a manual operation means 200 with a blunt object. The guillotine 16 is used when it is desired to sever the skirt 2 from the vessel under circumstances such as the sinking of the vessel.

Figure 7:
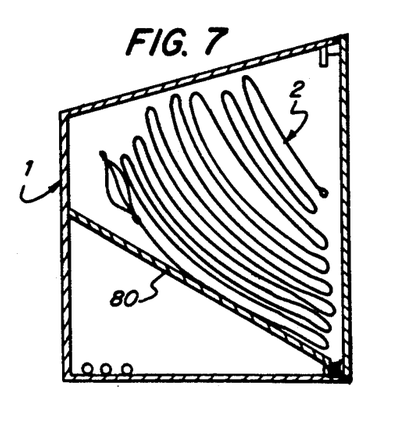
FIG. 7 is a view of a housing unit containing the water pollution containment device of the present invention.

In addition to the skirt segments 2a being pushed out of the housing units 1a by the spring 11 of the davit 7, it is possible to include a sloped floor 80, as shown in FIG. 7, that facilitates the launching of the skirt by further assisting the skirt in sliding out of the housing unit 1a. By angling the sloped floor 80, preferably at an angle of approximately 35° to the deck floor 5, the skirt 2 will slide out of the housing units 1a more readily than if the floor of the housing unit were merely horizontal. The space beneath the sloped floor 80 can be effectively utilized for passing electrical conduits and airlines through the area. The sloped floor 80 would preferably be discontinued in the area of the davit 7.

Figure 4:
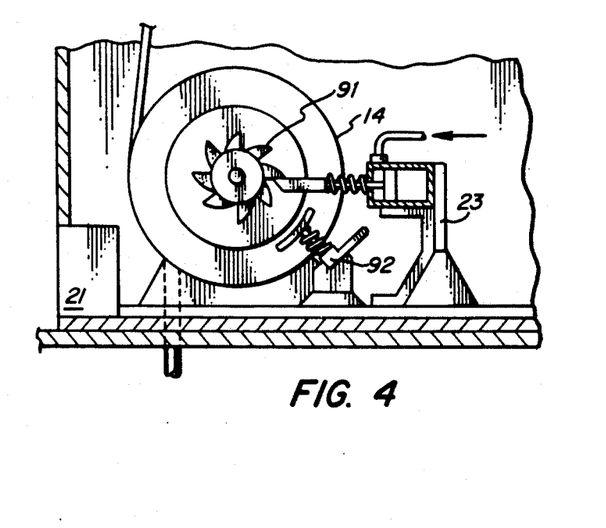
FIG. 4 is a view of several remotely actuatable components of the water pollution containment device.

In addition to launching the skirt 2 to contain pollution spills, it may be desirable to test the water pollution containment device 1 periodically, or to remove the skirt segments 2a from the housing units 1a for some reason, such as for making repairs to the skirt or to the housing unit interior. At the same time, it might be inconvenient to undertake a full-scale launch of the skirt 2 into the water. Consequently, the present invention includes means to launch the water pollution containment device 1 without unfolding the skirt 2 and fully extending the wire guide 15. One means of accomplishing this is shown in FIGS. 3 and 4. A circumferential groove 41 is machined into the tapered end 43 of the rod 8. A bore 46 is machined into the end portion 44 of the davit 7 in such a position that, when the tapered end 43 of the rod 8 sits in the end 44 of the davit 7, the bore 46 and the circumferential groove 41 are in alignment. An inspection door 18 in the roof 4 permits access to the housing unit 1a so that a pin 40 may be inserted through the bore 46 into the groove 41, fixing the rod 8 and the davit 7 relative to one another. When the rod 8 is pinned to the davit 7, a dummy loader 92 can be used to prevent the wire guide 15 from playing out from the winch 14 more than is necessary to rotate the davit 7 around its hinge 28. In this manner, it is possible to conduct periodic safety inspections and to remove the skirt 2 for repairs to the skirt or to the interior of the housing units 1a.

Figure 6:
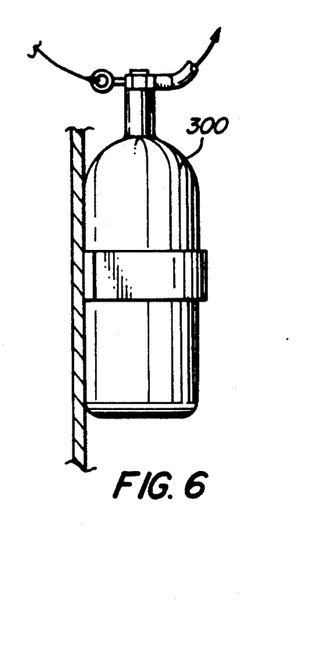
FIG. 6 is a view of a manually activated air cylinder that acts as a back up power system for deployment and retrieval of the water pollution containment device in the event of failure of a vessel's main air or electrical power supplies.

The water pollution containment unit 1 so described may be operated by remote signals from the bridge of a vessel that are received in a power box 21 of each housing unit 1a. The signals may be electrical or mechanical and may actuate selected solenoids to permit the use of a plentiful power supply such as compressed air, which is often available in abundance aboard ships, to operate parts such as release latches 13, 19 and 23, air motors (not shown) and guillotines 16. In the event of an onboard power failure, the water pollution containment device 1 may also be launched or severed manually. Each housing unit 1a may be equipped with an emergency backup power supply, such as an air cylinder 300, as shown in FIGS. 2 and 6, which facilitates manual, locally controlled launching and severing.

Because the structure of most of the individual sections of the plurality of water pollution containment devices is substantially the same, with minor modifications possibly necessary for sections used at such spots as the bow and the turn of the stern, and because the size of such devices are further a function of the size of the vessel upon which they are mounted, it is advantageous to be able to mass produce a variety of standard sized units. If the length of the skirt 2 is to be at least one and one half times the depth in water of the hull of the vessel upon which the water pollution control device is to be mounted, then standard sized units approximating the following table may be used:

| Width of Unit | Hght. of Unit | Depth. of Unit | Length of Skirt |
| --- | --- | --- | --- |
| 15' | 36" | 36" | 216' |
| 15' | 32" | 32" | 170' |
| 12 | 28" | 28" | 130' |
| 10' | 24" | 24" | 96' |
| 10' | 22" | 22" | 81' |
| 8.5' | 20" | 20" | 67' |
| 8.5' | 16" | 16" | 43' |
| 8.5' | 12" | 12" | 24' |

Of course, the housings may be larger than the sizes set forth above.

Many other widely different embodiments of the present invention can be made without departing from the scope thereof, and it is to be understood that the invention is not limited to the specific embodiments thereof except as defined in the appended claims.

What is claimed is:

1. A device for containing water pollution leaking from a vessel, comprising:
   a plurality of housing units;
   a skirt stored within each of said housing units;
   launching means within each housing unit for ejecting said skirt from the housing unit over the side of the vessel; and
   means for retrieving said skirt into the housing unit after the skirt has been launched;
   said plurality of units being disposed about the outer periphery of a vessel such that adjacent housing units and skirts are interconnected; and
   means for activating all of the launching means automatically by a remote control and means located at each housing unit for manually activating each launching means, wherein the means for activating the automatic launching means is powered by compressed air.

2. The device of claim 1, further comprising a tank of compressed air in each housing unit for powering the manual activating means.

3. The device of claim 1, wherein each of said skirts are of a length such that, when suspended around the periphery of said vessel by said launching means, they extend below the hull of said vessel.

4. The device of claim 3, wherein each of said skirts further include flotation members.

5. The device of claim 1, wherein each of said skirts comprises a trapezoid and is wider at a bottom edge than at a top edge.

6. The device of claim 1, wherein said launching means includes a spring-loaded davit rotatable about a hinge.

7. A device for containing water pollution leaking from a vessel, comprising:
   a plurality of housing units;
   a skirt stored within each of said housing units;
   launching means within each housing unit for ejecting its respective skirt from the housing unit over the side of the vessel;
   each of said launching means including a detachable weighted means for maintaining said skirt in position after the skirt has been launched, wherein said weighted means further provides a support for suspending said skirt within the housing when said weighted means is attached to said launching means; and
   means for retrieving said skirt into the housing unit after the skirt has been launched;

said plurality of units being disposed about the outer periphery of a vessel such that adjacent housing units and skirts are interconnected.

8. The device of claim 7, wherein said weighted means includes a rod having a weight fixed to one end thereof and said rod is connected to said launching means by a wire guide.

9. The device of claim 8, further comprising a plurality of rings fixed to skirt, and said wire guide extends through said rings, wherein the relative sizes of said rings, rod, and weight are such that the rings may fit over the rod but cannot pass over the weight fixed to the rod.

10. A device for containing water pollution leaking from a vessel, comprising:

a plurality of housing units;

a skirt stored within each of said housing units;

launching means within each housing unit for ejecting said skirt from the housing unit over the side of the vessel;

each of said launching means includes a davit pivotably mounted at a first end thereof to the floor of its respective housing unit, said davit being pivotable between a stored position and a launched position;

each of said launching means further including a spring for urging the davit into the launched position; and means for retrieving said skirt into the housing unit after the skirt has been launched;

said plurality of units being disposed about the outer periphery of a vessel such that adjacent housing units and skirts are interconnected.

11. The device of claim 10, further including a rod detachably mounted to a second end of said davit for suspending the skirt within said housing when said davit is in a stored position.

12. The device of claim 11, further comprising a wire guide interconnecting the rod with its respective skirt and the launching means.

13. The device of claim 12, further comprising means for severing the wire guide so that the skirt may be completely detached from the vessel.

14. The device of claim 11, further comprising a socket at the second end of the davit for receiving the rod and means for locking said rod within said socket.

* * * * *